US012517499B2

(12) United States Patent
Trifoglio et al.

(10) Patent No.: US 12,517,499 B2
(45) Date of Patent: Jan. 6, 2026

(54) METHOD FOR THE DEPLOYMENT OF A SOFTWARE MODULE IN A MANUFACTURING OPERATION MANAGEMENT SYSTEM

(71) Applicant: Siemens Aktiengesellschaft, Munich (DE)

(72) Inventors: Giuliano Trifoglio, Genoa (IT); Marco Magagnini, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 645 days.

(21) Appl. No.: 17/869,953

(22) Filed: Jul. 21, 2022

(65) Prior Publication Data

US 2023/0082523 A1    Mar. 16, 2023

(30) Foreign Application Priority Data

Aug. 4, 2021   (EP) .................................... 21189558

(51) Int. Cl.
    *G05B 19/418*   (2006.01)
    *G06F 8/60*     (2018.01)
(52) U.S. Cl.
    CPC ......... *G05B 19/41835* (2013.01); *G06F 8/60* (2013.01)
(58) Field of Classification Search
    CPC ............... G06F 8/60; G06F 2209/5021; G06F 2209/503; G06F 9/5027; G05B 19/0426; G05B 19/056; G05B 2219/23276; G05B 2219/23278; Y10S 715/967
    See application file for complete search history.

(56) References Cited

U.S. PATENT DOCUMENTS

| 11,210,133 | B1* | 12/2021 | Barker, Jr. ............. G06F 9/4862 |
| 2014/0280961 | A1* | 9/2014 | Martinez ................. H04L 41/40 |
| | | | 709/226 |
| 2019/0129702 | A1 | 5/2019 | Zafar et al. |
| 2020/0183680 | A1 | 6/2020 | Whitcomb et al. |
| 2021/0216306 | A1* | 7/2021 | Moeller .................. G06F 8/656 |
| 2021/0356944 | A1* | 11/2021 | Chauvet ............. H04L 12/2803 |
| 2021/0397166 | A1* | 12/2021 | Sayyarrodsari ........... G06F 8/30 |
| 2022/0100917 | A1* | 3/2022 | McGregor .............. G06T 13/20 |

* cited by examiner

*Primary Examiner* — Mohammad Ali
*Assistant Examiner* — Dhruvkumar Patel
(74) *Attorney, Agent, or Firm* — Laurence A. Greenberg; Werner H. Stemer; Ralph E. Locher (57) ABSTRACT

A software module is deployed in a MOM system without requiring the operator to know where to deploy the software module within the network of the computational resources that are addressed and/or accessed within the MOM system. A number of software modules are provided, each including a set of metadata with a number of deploy criteria. A plurality of computational resource layers are provided, with each resource layer having different computational resources and being enabled to communicate layer specific data, which include resource availability information. A deployment instance is executed that evaluates the metadata and the layer specific data and, depending on the evaluation, the computational resource layer and the computational resource on which the software module will be deployed is determined. The software module is then executed on the determined computational resource within the determined computational resource layer.

12 Claims, 5 Drawing Sheets

| | Required DigitalTwinDistance | RequiredResources | Required Capability | Priority |
|---|---|---|---|---|
| SM1 TNT — TraceNTrack Module | TWIN | 50 cpuQ, 50 MemQ, 20 NetQ, 20 DataQ | None | 1 |
| SM2 DSP — Dispatch Module | NEAR | 100 cpuQ, 100 MemQ, 20 NetQ, 100 DataQ | HA | 2 |
| SM3 FTM — FactoryModel Module | REMOTE | 100 cpuQ, 50 MemQ, 10 NetQ, 20 DataQ | HA | 2 |
| SM4 MTM — MaterialModel Module | REMOTE | 100 cpuQ, 50 MemQ, 10 NetQ, 20 DataQ | HA | 2 |
| SM5 PLN — Planning Module | GLOBAL | 200 cpuQ, 200 MemQ, 50 NetQ, 200 DataQ | HA | 3 |
| SM6 IM — Intelligence Module | GLOBAL | 500 cpuQ, 500 MemQ, 100 NetQ, 1000 DataQ | HA | 4 |
| DM DYM — Deployer Module | | | | |

MD — Required Resources

METHOD FOR THE DEPLOYMENT OF A SOFTWARE MODULE IN A MANUFACTURING OPERATION MANAGEMENT SYSTEM

CROSS-REFERENCE TO RELATED APPLICATION

This application claims the priority, under 35 U.S.C. § 119, of European Patent Application 21189558.6 (EP21189558), filed Aug. 4, 2021; the prior application is herewith incorporated by reference in its entirety.

FIELD AND BACKGROUND OF THE INVENTION

The present invention relates to a method for the deployment of a software module in a manufacturing operation management system—hereinafter called MOM system.

In the world of process automation and process monitoring standard automation systems for controlling the widest conceivable variety of production resources, machines and plants (MOM objects) are state of the art. Such technology covers in particular a broad range of products which are offered by Siemens® (Siemens Corporation) under its OpCenter® product family with the field of manufacturing operation management (MOM). An extensive line of products for solving the technical tasks in question such as counting, measuring, positioning, motion control, closed-loop control and cam control enhance the performance capabilities of appropriate process controllers. A variety of configurations enable the implementation of flexible machine concepts.

In this context a broad range of IT solutions exist to connect the actual hardware close to the technical and/or logistical process to the application layer of the client driving the installation. Manufacturing execution systems (MES) have therefore been developed to meet all of the requirements of a service-oriented architecture (SOA) to integrate seamlessly into a totally integrated automation (TIA). A plug & play architecture, in which the individual functions can be configured and easily combined with each other thereby forms the basis for this success thereby simplifying the complex structures of controlling a manufacturing plant or the like.

These demands very often require in the backbone rather complicated and sophisticated software solutions which enable the approach of totally integrated automation. In view of this, the software engineers very often use production modeling software to define the plant model and its standard operating procedures and create the respective new software by means of a high-level graphical language which identifies the workflow of activities within the software. Subsequently, this string/term of high-level graphical language is translated into a client based software language executable on the machine language level. This translation requires tremendous efforts in programming and need serious testing to check whether the translated program behaves the same as the original string/term of the high level graphical language.

Within this MES environment a software for a detailed production scheduling (PDS) is provided which concerns the sequencing and the timing of production operations on all manufacturing resources. The software has the aim to create an executable and optimized production schedule that will be executed in production. Before the schedule will be computed, the PDS software needs to be fed with the main input from a plant database such as:
  the plant logical layout and material flow constraints;
  the equipment and personnel standard production rates;
  the availability, the calendar and the status of the equipment and personnel;
  knowledge on the way of production (recipes, routings, etc.), process and business constraints;
  the skills provided by the production resources.

Together with this information the PDS software builds its internal model of the plant and of the production process within this plant. Subsequently, by applying the scheduling algorithms to this internal plant model of the plant's resources (MOM objects) and production process, the PDS software computes an executable production schedule which does not violate any physical, logistical and/or business constraints and which optimizes the manufacturing performance.

At this stage, it will be understood that a number of plant and/or machine operators need to interact with the MOM system by means of user interfaces (UI) that are provided on customizable MES screens (UI clients) being displayed on fixed workstations and/or on mobile tablets and the like. Very often, these plant and/or machine operators need to deploy new software modules and/or updates of existing software modules. Due to the complexity of a modern MOM system, there does not exist any longer the concept of a single software instance that can be deployed in a single data center of the MOM system. The MOM software is modularized and distributed in many different levels (machine level, edge device level, data center level, plant level, cloud (private or public) and so on.

Notwithstanding the afore-mentioned, software modules in the MOM system needs to be installed simply manually by the IT administrators. These operations takes time and the software modules themselves do not provide any capability to auto-suggest the right layer in which they can/should be installed. The roles of the MOM business and the IT have to work together in order to decide the best optimized deployment scenario and needs to know for this purpose the business scope and the resource requirements of the software modules that is planned to be deployed. This cooperative action takes a lot of time and cannot be repeated frequently.

SUMMARY OF THE INVENTION

It is accordingly an object of the invention to provide a method which overcomes the above-mentioned disadvantages of the heretofore-known devices and methods of this general type and which provides for a method for deploying a software module in a MOM system that does not require any knowledge of the operator where to deploy the software module within the network of the computational resources that are addressable/accessible within the MOM system.

With the above and other objects in view there is provided, in accordance with the invention, a method for the deployment of a software module in a manufacturing operation management system (MOM system). The novel method comprises the following steps:
  providing a number of software modules to be deployed, wherein each software module comprises a set of metadata; said metadata comprising a number of deploy criteria;
  providing a plurality of computational resource layers; each resource layer comprising a number of computational resources and being enabled to communicate layer specific data, said layer specific data comprising at least data representing resource availability information;

executing a deployment instance that evaluates the metadata and the layer specific data;

determining in dependency of the metadata and the layer specific data the computational resource layer and the computational resource on which the software module will be deployed; and executing the software module on the determined computational resource within the determined computational resource layer.

Therefore, the present invention provides a new functionality in the MOM system which enables the (IT) operator to deploy new and/or updated software modules which provide by its metadata a detailed knowledge where to launch the respective software module. Further, the operator does not need to distribute the software module himself and does not need to be aware of the requirements of each software module (in terms of data, business, needs, etc.) since the deployment instance is now aware about it and is able to autonomously install the software module in the right layer of a usually very complex distributed architecture of the computational resources in the MOM system.

In a preferred embodiment of the present invention, the layer specific data enables the deployment instance to determine an available computational resource within the determined computational resource layer.

Further, the quality of the metadata assigned to each software module is decisive for the success of the right deployment of the respective software module. A sufficiently clear structure of the metadata can be achieved when the deploy criteria in the metadata are one or more of the following criteria:

a Digital Twin Distance which defines the proximity relation of the software module to the functionality of the module within the MOM system;

a required resource capacity which defines the capacities which a computational resource requires to run the software module, said required resource capacity comprising a set of computationally relevant values, such as computational quotes, memory quotes, network quotes and/or data volume quotes;

a required resource capability which defines the basic capabilities which a computational resource requires to run the software module, said required resource capability comprising a set of relevant capability data, such as security, redundancy and/or availability; and/or a priority value indicating the priority of the software module to be deployed.

The term of the Digital Twin Distance appears to be a quiet abstract definition but, in reality, is provides an idea on the logical distance between the real production and the computational layer in which the software module can be deployed. Simple examples are for example a new software module that controls the movements/trajectories of a production robot and new software modules that calculate a new set of production relevant KPIs (key performance indicators). It is clear that when the Digital Twin Distance of the first module is zero or almost zero that means that this software module has to be executed within the computational resource which controls this specific robot. With respect to the latter software module, the Digital Twin Distance can be quite large since a KPI calculation tool can run either with the IT backbone at plant/premise level or even higher in service as a cloud environment (private or public cloud).

Thus, a preferred embodiment of the present invention can be achieved when the Digital Twin Distance comprises the following values:

a) a value "0 OR TWIN" which indicates that the software module needs to run physically in the same place in which the business logic of the software module is executed; i.e., a smart device that follows the operator and/or an edge device installed together with a production resource thus resulting in a software and business distance that is close or equal to "zero" and that means that there is no delay introduced by the communication networks and the risk of disconnections are reduced to the minimum;

b) a value "1 OR NEAR" which indicates that the software modules needs to be physically installed in the same environment; i.e., the software module is installed in the plant or area datacenter and an operator accesses to it through a client;

c) a value "2 OR REMOTE" which indicates that the software module is physically installed in a remote environment; i.e., the software module is installed in a regional headquarter datacenter and the operator accesses to it through a client; and/or d) a value "3 OR GLOBAL" which indicates that the software module is typically installed in a cloud (private or public) and the assignment/creation of resources is strongly dynamic and theoretically infinite, the respective computational layer can typically have a dynamic cost according to the usage of the computational resources.

In a further preferred embodiment of the present invention, each computational resource layer is assigned to a predetermined value of the Digital Twin Distance. This assignment helps to identify with the value for the Digital Twin Distance comprised in the metadata of the software module to unanimously identify the respective computational environment for the deployment of the software module.

Other features which are considered as characteristic for the invention are set forth in the appended claims.

Although the invention is illustrated and described herein as being embodied in a method for the deployment of a software module in a manufacturing operation management system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawing in detail and first, in particular, to FIG. 1 thereof, there is shown a schematic overview of a manufacturing operation management system—hereinafter called MOM system 2—that comprises a number of computational resources C0 to C3 that are organized in different computational resource layers L0 to L3. In the layer L0— hereinafter called Digital Twin layer—at show floor level, a number of operators 4 are working in a direct Digital Twin Environment using industrial PCs, industrial handhelds, barcode scanners and the like as computational resources C0. The operators 4 require these computational resources C0 to control and monitor the industrial production processes at closest proximity to the real production operations.

In the layer L1— hereinafter called Near Environment layer L1—at office level, a number of operators 6 are working in the vicinity of (i.e., near) the real production process within the plant (Main Site, Remote Site) in the function of supervisors and the like using industrial PCs, industrial tablets, smart phone and the like as computational resources C1. The operators 6 require these computational resources C1 for example to monitor the KPIs of the industrial production processes at a close proximity to the real production operations.

In the layer L2— hereinafter called Remote Environment layer L2—at HQ/data center level, a number of remote users 8 are working in the remote environment to the real production process in the function of administrators, IT specalists, engineers, schedulers and managers and the like using PCs, industrial PCs, industrial tablets, smart phone and the like as computational resources C2. The remote user 8 require these computational resources C2 for example to model the production and its production steps, to schedule the production operations, to manage the data repositories used among the industrial processes, to administrate all related process data, resources, personnel, and to run an administrative enterprise resource planning system ERP and its links to the MOM system 2 at only a remote proximity to the real production operations.

In the layer L3— hereinafter called Global Environment layer L3—at global level (private or public cloud), a number of remote users 10 are working in the global environment far from the real production process in the function of CEO, CFO, departments leaders, administrators, IT specialists, engineers, schedulers and managers and the like. They use PCs, industrial PCs, industrial tablets, smart phones and the like as computational resources C3. The operators 8 require these computational resources C3 for example to review the KPI's, to manage the enterprise and to provide data to governmental and/or life science organizations, e.g. drug authorities (FDA), and administrate all related process data, resources, personnel, and to run an administrative enterprise resource planning system ERP and its links to the MOM system 2 at a very remote location to the real production operations.

All computational resources C0 to C3 are linked by wire and/or wireless to an enterprise network EN and/or the Internet 12 by respective network devices N1, N2, such as routers, servers and the like.

Figure 2:
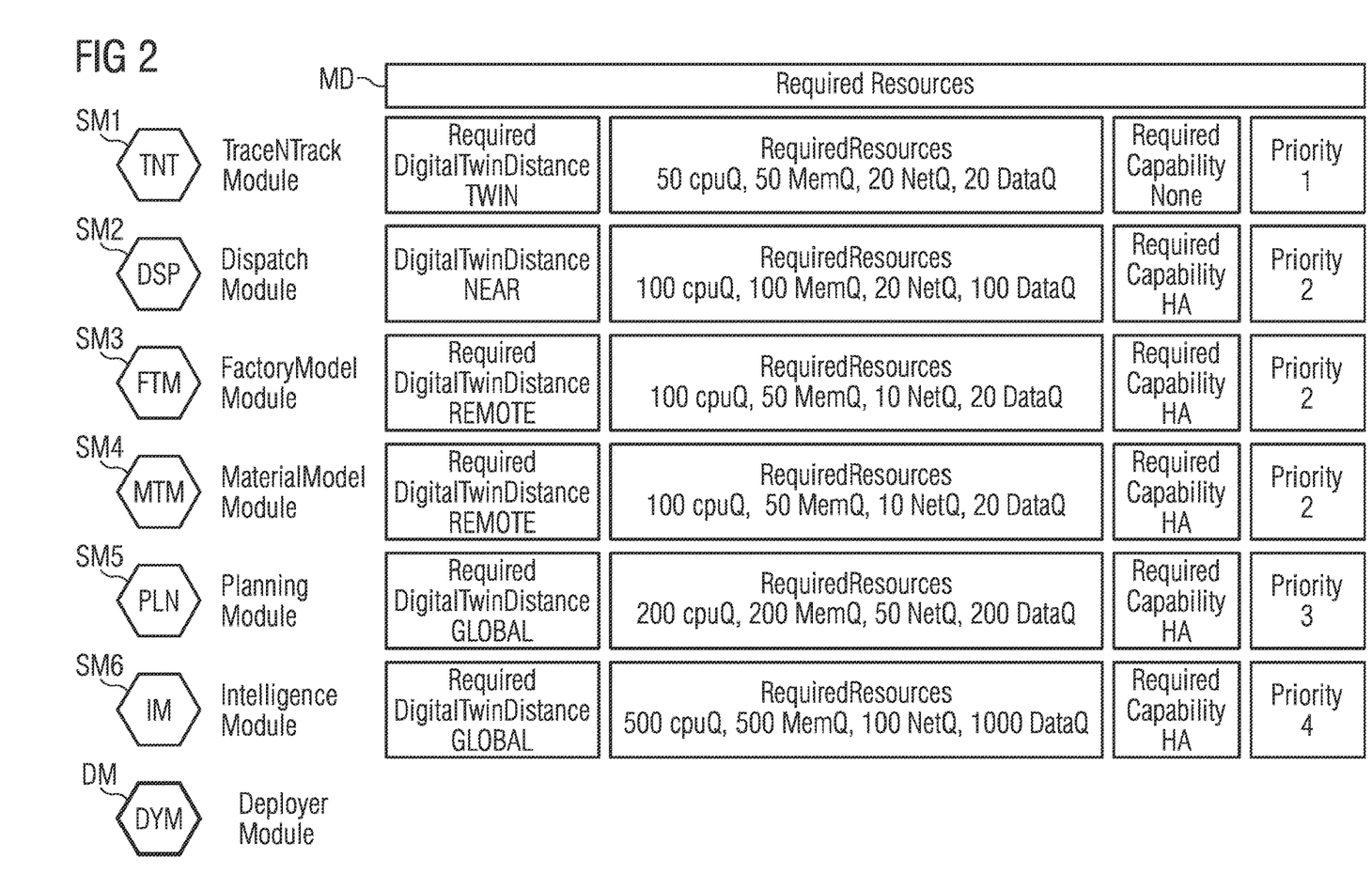
FIG. 2 is a schematic example of a number of software modules and the related sets of metadata.

Referring now to FIG. 2, there is shown an overview over a number of software modules SM1 to SM6 and a respective set of metadata MD assigned to each software module SM1 to SM6. In particular, the metadata MD comprises a number of deploy criteria listed in the table for the metadata MD. In the left column, a Digital Twin Distance value is given which defines the proximity relation of the software module SW to the functionality of the module within the MOM system 2. In the present example, the Digital Twin Distance may comprise the following values:

a) a value "0 OR TWIN" which indicates that the software module needs to run physically in the same place in which the business logic of the software module is executed; i.e., a smart device that follows the operator and/or an edge device installed together with a production resource thus resulting in a software and business distance that is close or equal to "zero" and that means that there is no delay introduced by the communication networks and the risk of disconnections are reduced to the minimum;

b) a value "1 OR NEAR" which indicates that the software modules needs to be physically installed in the same environment; i.e., the software module is installed in the plant or area datacenter and an operator accesses to it through a client;

c) a value "2 OR REMOTE" which indicates that the software module is physically installed in a remote environment; i.e., the software module is installed in a regional headquarter datacenter and the operator accesses to it through a client; and/or    d) a value "3 OR GLOBAL" which indicates that the software module is typically installed in a cloud (private or public) and the assignment/creation of resources is strongly dynamic and theoretically infinite, the respective computational layer can typically have a dynamic cost according to the usage of the computational resources.

In the second column, a required resource capacity is given which defines the capacities which a computational resource requires to run the software module, said required resource capacity comprising a set of computationally relevant values, such as computational quotes, memory quotes, network quotes and/or data volume quotes. In the third column, a required resource capability is given which defines the basic capabilities which a computational resource requires to run the software module, said required resource capability comprising a set of relevant capability data, such as security, redundancy and/or availability. In the right column, a priority value is given indicating the priority of the software module to be deployed.

This metadata MD is analyzed by a deployer module DM in order to determine the computational resource layer L0 to L3 where the respective software module SM1 to SM6 needs to be deployed.

Figure 3:
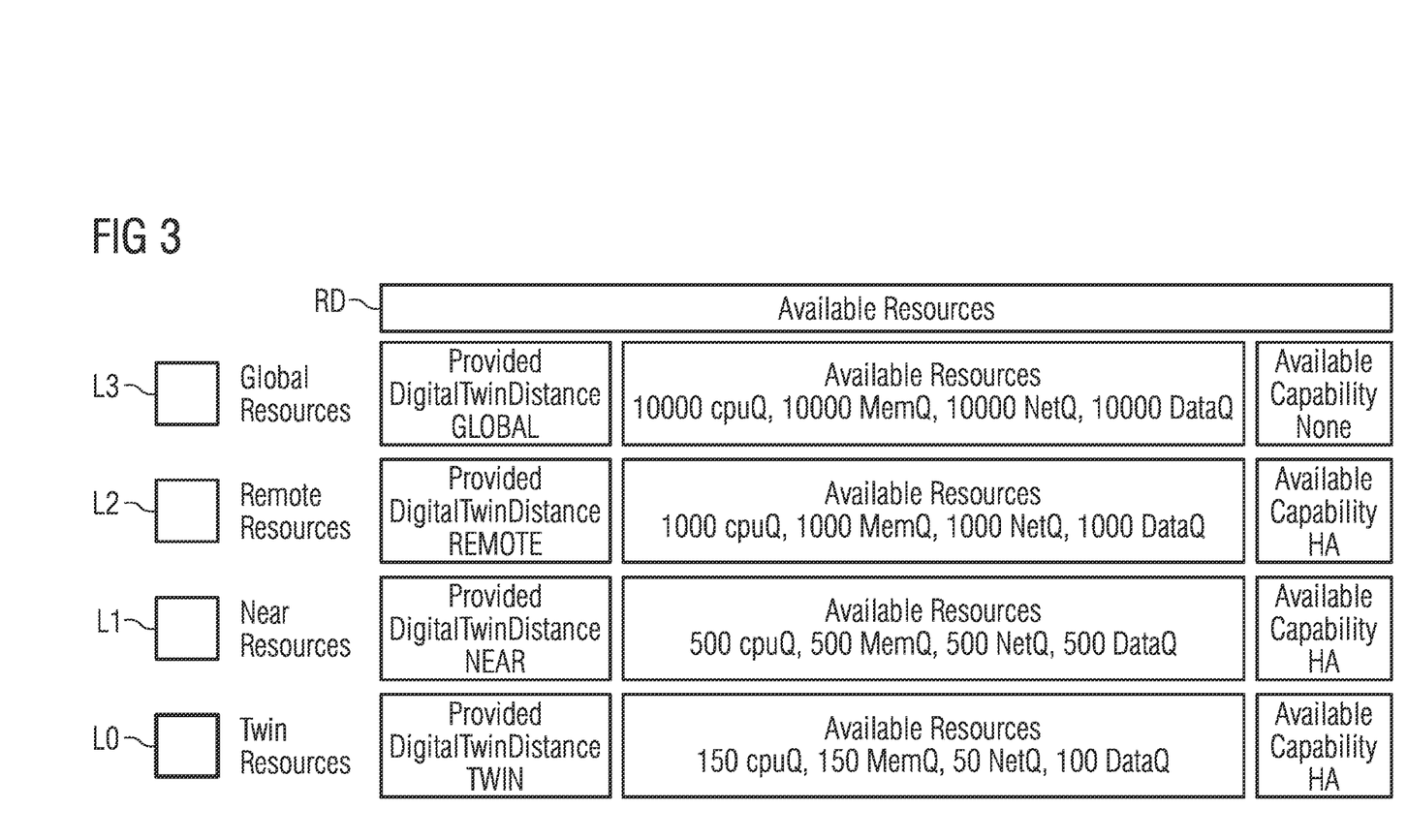
FIG. 3 is a schematic overview of the computational resources present in the MOM system according to FIG. 1.

Referring now to FIG. 3, there is shown a schematic overview over the computational resource layers L0 to L3 and layer specific data RD. This layer data comprises in the left column the Digital Twin Distance that can be provided by the respective layer. The second column provides an information on the computationally relevant values, such as computational quotes, memory quotes, network quotes and/or data volume quotes. The right column provides the information on the available capability that the respective layer offers. Thus, this layer specific data RD suffices for the deployer module DM to map the metadata MD provided by each software module SD1 to SD6 to the intended computational resource layer L0 to L3.

Figure 1:
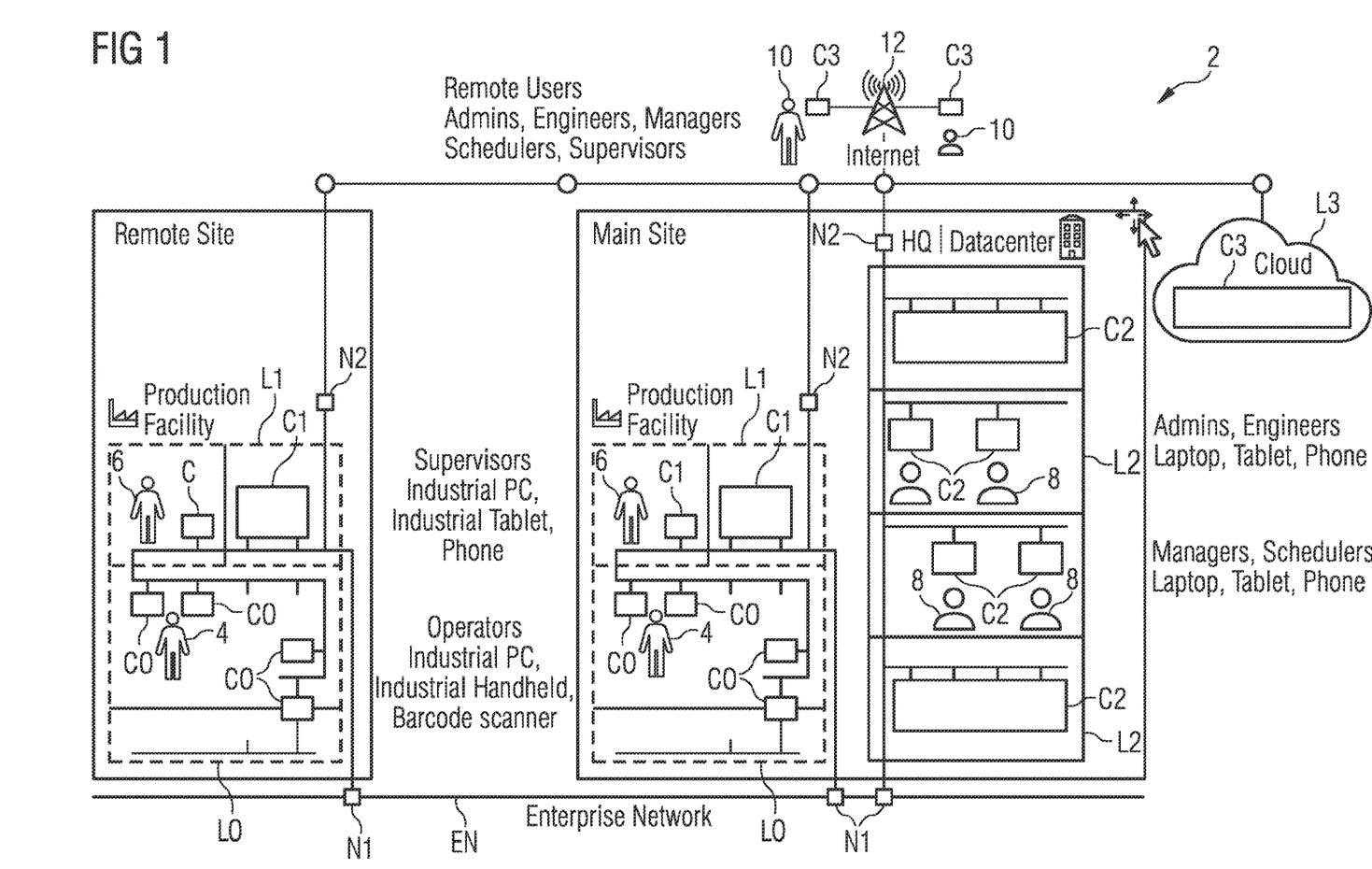
FIG. 1 is a schematic overview of a manufacturing operation management system and the computational resources distributed in the MOM system.
Figure 4:
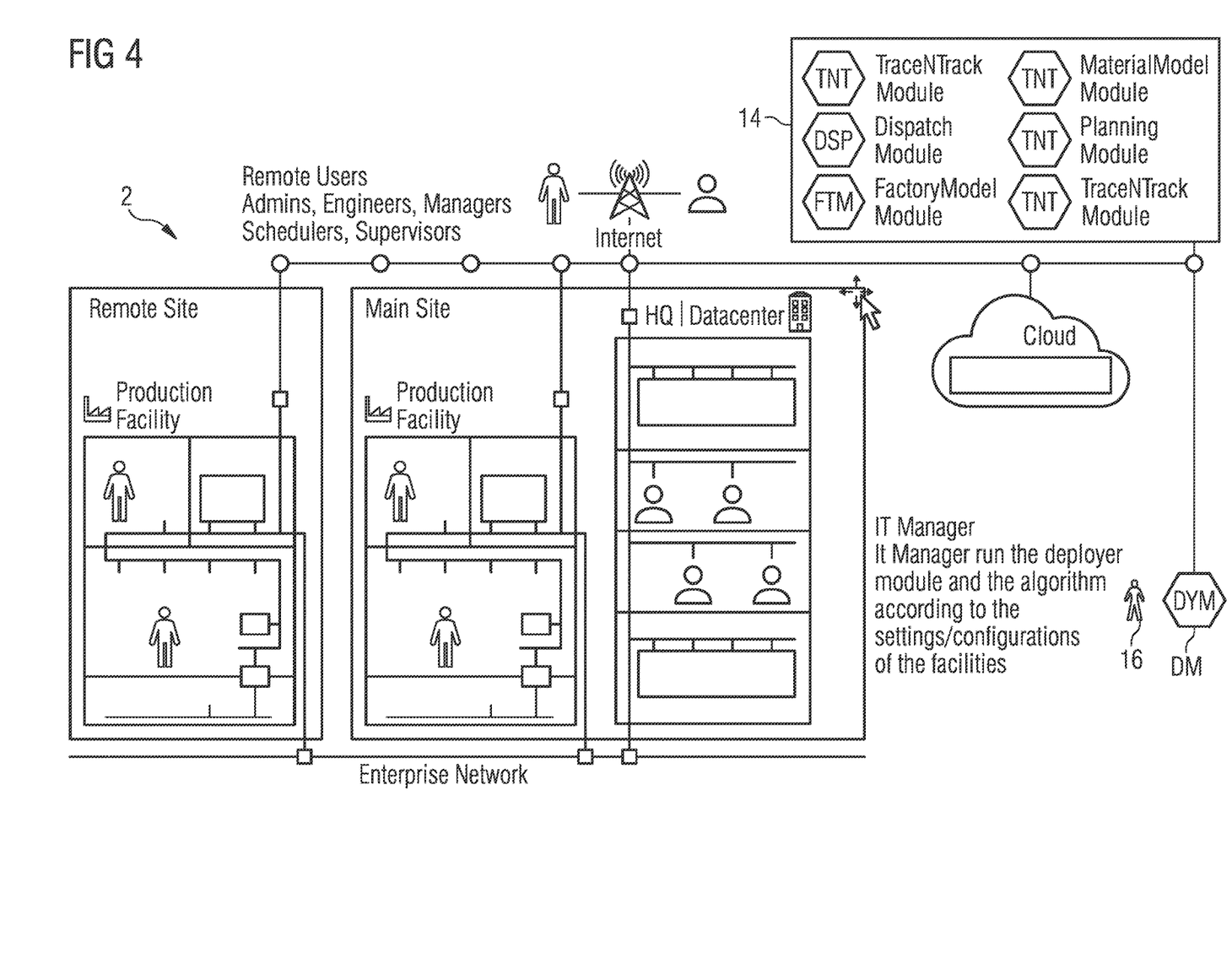
FIG. 4 is a schematic overview of the MOM system according to FIG. 1 with an additional deployer module.

Referring now to FIG. 4, there is shown a schematic overview of the MOM system 2 according to FIG. 1 with the additional deployer module DM and a software module repository 14 where the software module SM1 to SM6 are waiting for their deployment. For the sake of simplicity of the drawings the reference numbers for parts in the FIGS. 4 and 5 which have been already introduced in FIG. 1 are omitted.

Thanks to the capabilities of the deployer module DM, the customer, i.e., an IT user 16, can access the software module repository 14 and pick and distribute the software module SM1 to SM6 automatically to the computational resource layer L0 to L3 thereby using a simple algorithm (see below) to assign the software module by the analysis of its related metadata MD to the computational resource C0 to C3. As each software module is designed for a specific business scope, so the software modules "know" by the presentation of its metadata MD to the deployer module DM its specific requirements. This metadata MD which is consumed by the deployer module DM is shipped with the software module itself.

Deployer Module Algorithm

```
_CustomerModules = GetModulesByPriority(_CustomerID)
Foreach _Module in (_CustomerModules)
{
    /*the cycle starts with the module with highest priority*/
    _CustomerEnvironments =
    GetCustomerAvailableEnvironments(CustomerID)
    _TargetEnvironment =
    FindRightEnvironment(CustomerEnvironments,
        _Module.RequiredDigitalTwinDistance,
        _Module.RequiredResources,
        _Module.RequiredCapability)
    if (_TargetEnvironment is not null) then
    {
    Deploy(_Module, _TargetEnvironment)
    /*By installing a module in the target environment, the resources of that
    environment must be decreased because they are consumed by the just
    deployed module*/
    UpdateEnvironmentResources(_TargetEnvironment,
    _Module.RequiredResources)
    }
}
```

Figure 5:
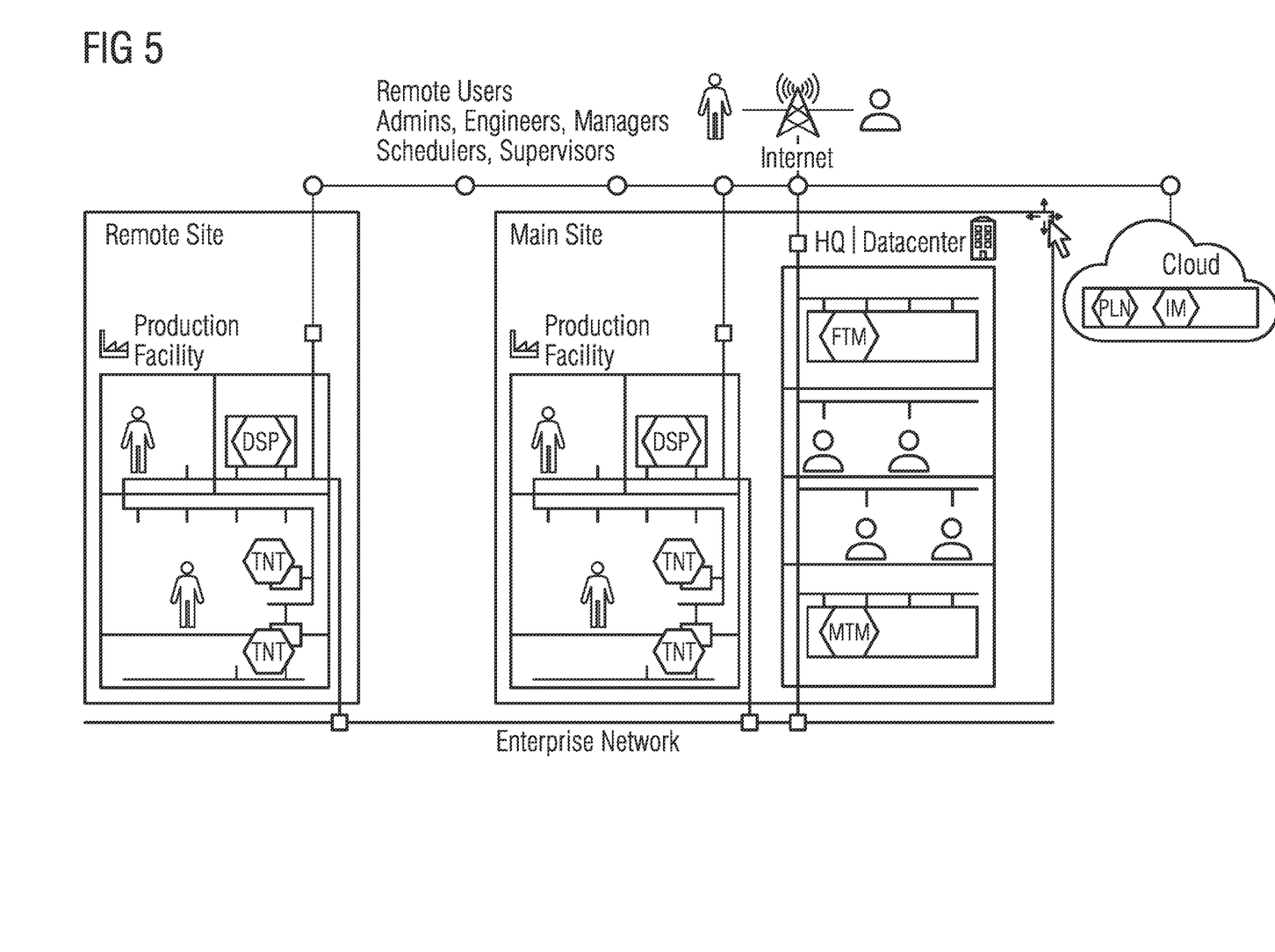
FIG. 5 is a schematic overview of the MOM system according to FIG. 4 with a number of deployed software modules.

Referring now to FIG. 5, there is shown schematically the resulting positions of the now deployed software modules SM1 to SM6 within the diverse computational resource layers L0 to L3. For example, the software module SM1 dedicated for a track & trace functionality has the Digital Twin Distance "TWIN" and a priority of "1" which means that this software module SM1 has been the first software module that has been deployed. According to its metadata, the deployer module deployed this software module SM1 in the digital twin layer L0. The software module SM2 has a dispatch functionality and has been deployed according to its metadata MD to the Near environment layer L1. The software module SM3 has a factory model functionality and has been deployed according to its metadata MD to the Remote Environment layer L2. The same applied to the software module SM4 which has a material model functionality. These software modules SM3 and SM4 are rather engineering type modules which classifies them to the Remote Environment Layer L2. The software modules SM5 and SM6 have an engineering type as well but the functionality of these modules SM5 and SM6 is rather applicable in a more generic and global manner which classifies them as a candidate for the deployment in the Global Environment Layer L3. This assignment is currently "nailed" to these software modules SM5 and SM6 by their respective metadata MD.

Thus, the algorithm of the Deployer Module DM will perform the installation in this way: first of all the software module with highest priority is taken and according to the required resources required in terms of both capability and capacity, the algorithm will select the computational resource layer with the same DigitalTwin Distance (or the closest one) and enough available resources to run the software module. Every time that a software module is assigned to a specific computational resource layer, the deployer module DM will automatically calculate the remaining available resources. After the first software module is assigned to a computational resource layer and installed, the deployer module DM will pick the next software module SM1 to SM6 according to the assigned priority and by applying the same algorithm decides (and installs) the software module in the right computational resource layer.

Therefore, the present invention provides with the functionality of the deployer module DM (deployer instance) a new functionality in the MOM system 2 which enables the (IT) operator to deploy new and/or updated software modules SM1 to SM6 which provide in terms of its metadata a detailed knowledge where to launch the respective software module. Further, the operator does not need to distribute the software module himself and does not need to be aware of the requirements of each software module (in terms of data, business, needs, etc.) since the deployment instance is now aware about it and is able to autonomously install the software module in the right layer of a usually very complex distributed architecture of the computational resources in the MOM system 2.

The invention claimed is:

1. A method of deploying a software module in a manufacturing operation management system (MOM system), the method comprising:
   a) providing a plurality of software modules to be deployed, each software module having a set of metadata, and the metadata including a number of deploy criteria, the deploy criteria including a Digital Twin Distance that defines a proximity relation of the software module to a functionality of the module within the MOM system;
   b) providing a plurality of computational resource layers, with each of the resource layers having a number of computational resources and being enabled to communicate layer specific data, the layer specific data including at least data representing resource availability information;
   c) executing a deployment instance that evaluates the metadata and the layer specific data;
   d) determining, in dependence on the metadata and the layer specific data, a computational resource layer and a computational resource on which the software module will be deployed; and
   e) executing the software module on the computational resource within the computational resource layer determined in step d).

2. The method according to claim 1, wherein the layer specific data is configured to enable a deployment instance to determine an available computational resource within the determined computational resource layer.

3. The method according to claim 1, wherein the deploy criteria in the metadata additionally includes one or more of the following criteria:

a) a required resource capacity which defines capacities required of a computational resource to run the software module, the required resource capacity comprising a set of computationally relevant values;
b) a required resource capability which defines basic capabilities required of a computational resource to run the software module, the required resource capability comprising a set of relevant capability data; or
c) a priority value indicating a priority of the software module to be deployed.

4. The method according to claim 3, wherein the computationally relevant values of the required resource capacity are selected from the group consisting of computational quotes, memory quotes, network quotes, and data volume quotes.

5. The method according to claim 3, wherein the relevant capability data of the required resource capability are selected from the group consisting of security, redundancy, and availability.

6. The method according to claim 1, wherein the Digital Twin Distance comprises one or more of the following values:
a) a value "0 OR TWIN" which indicates that the software module needs to run physically in the same place in which the business logic of the software module is executed;
b) a value "1 OR NEAR" which indicates that the software modules need to be physically installed in the same environment;
c) a value "2 OR REMOTE" which indicates that the software module is physically installed in a remote environment; or
d) a value "3 OR GLOBAL" which indicates that the software module is typically installed in a cloud (private or public) and an assignment or creation of resources is strongly dynamic and theoretically infinite, and the respective computational layer typically has a dynamic cost according to a usage of the computational resources.

7. The method according to claim 6, wherein the value "0 OR TWIN" prescribes a smart device that follows the operator and/or an edge device installed together with a production resource which resulting in a software and business distance that is close or equal to zero so that no delays are introduced by a communication networks and that a risk of disconnections is reduced to a minimum.

8. The method according to claim 6, wherein the value "1 OR NEAR" indicates that the software module is installed in the plant or area datacenter and an operator accesses the software module through a client.

9. The method according to claim 6, wherein the value "2 OR REMOTE" indicates that the software module is installed in a regional headquarter datacenter and the operator accesses the software module through a client.

10. The method according to claim 6, which comprises assigning each computational resource layer to a predetermined value of the Digital Twin Distance.

11. A method of deploying a software module in a manufacturing operation management system (MOM system), the method comprising:
a) providing a plurality of software modules to be deployed, each software module having a set of metadata, and the metadata including a number of deploy criteria indicating a computational resource layer where the respective software module is to be deployed, the deploy criteria including a Digital Twin Distance that defines a proximity relation of the software module to a functionality of the module within the MOM system, the proximity relation indicating a logical distance between the real production and the computational layer in which the software module can be deployed;
b) providing a plurality of computational resource layers, with each of the resource layers having a number of computational resources and being enabled to communicate layer specific data, the layer specific data including at least data representing resource availability information;
c) executing a deployment instance that evaluates the metadata and the layer specific data;
d) determining, in dependence on the metadata and the layer specific data, a computational resource layer and a computational resource on which the software module will be deployed; and
e) executing the software module on the computational resource within the computational resource layer determined in step d).

12. The method according to claim 11, wherein the deploy criteria in the metadata additionally includes one or more of the following criteria:
a) a required resource capacity which defines capacities required of a computational resource to run the software module, the required resource capacity comprising a set of computationally relevant values;
b) a required resource capability which defines basic capabilities required of a computational resource to run the software module, the required resource capability comprising a set of relevant capability data; or
c) a priority value indicating a priority of the software module to be deployed.

* * * * *